United States Patent [19]
Chau

[11] Patent Number: 5,585,726
[45] Date of Patent: Dec. 17, 1996

[54] ELECTRONIC GUIDANCE SYSTEM AND METHOD FOR LOCATING A DISCRETE IN-GROUND BORING DEVICE

[75] Inventor: Albert W. Chau, Woodinville, Wash.

[73] Assignee: UTILX Corporation, Kent, Wash.

[21] Appl. No.: 451,302

[22] Filed: May 26, 1995

[51] Int. Cl.⁶ .......................... E21B 47/022; E21B 7/04; E21B 47/12; G01V 3/08
[52] U.S. Cl. .......................... 324/326; 175/45; 340/853.5
[58] Field of Search .......................... 324/207.22, 207.26, 324/326, 345, 346; 33/304; 73/151; 340/853.4, 853.5, 853.6, 853.8; 175/26, 40, 45, 61, 62; 364/444, 449

[56] References Cited

U.S. PATENT DOCUMENTS

| | | |
|---|---|---|
| 3,406,766 | 10/1968 | Henderson . |
| 3,853,185 | 12/1974 | Dahl et al. . |
| 4,399,692 | 8/1983 | Hulsing, II et al. . |
| 4,542,647 | 9/1985 | Molnar . |
| 4,637,480 | 1/1987 | Obrecht et al. . |
| 4,806,869 | 2/1989 | Chau et al. . |
| 4,875,014 | 10/1989 | Roberts et al. . |
| 4,881,083 | 11/1989 | Chau et al. . |
| 4,957,172 | 9/1990 | Patton et al. . |
| 5,155,442 | 10/1992 | Mercer . |
| 5,155,916 | 10/1992 | Engebretson . |
| 5,230,387 | 7/1993 | Waters et al. . |
| 5,258,755 | 11/1993 | Kuckes . |
| 5,320,180 | 6/1994 | Ruley et al. . |

*Primary Examiner*—Gehard R. Strecker
*Attorney, Agent, or Firm*—Christensen O'Connor Johnson & Kindness PLLC

[57] ABSTRACT

A guidance system for a drill tool (60) comprising a primary navigation package (80) and a secondary navigation package (74). The primary navigation package contains a triaxial magnetometer and a triaxial accelerometer. The set of signals produced by the triaxial magnetometer and triaxial accelerometer are manipulated to determine the orientation of the drill tool and, by integration over the distance the drill tool has traveled, the approximate position of the drill tool during a directional drilling operation. The secondary navigation package contains a magnetic dipole antenna for emitting an electromagnetic dipole field. Using a locator (100), an operator can periodically determine the actual drill tool position by detecting the electromagnetic dipole field. The actual position of the drill tool as determined by the secondary navigation package is used to correct for an integration error that is introduced into the drill tool position by the navigation technique used by the primary navigation package.

24 Claims, 8 Drawing Sheets

ELECTRONIC GUIDANCE SYSTEM AND METHOD FOR LOCATING A DISCRETE IN-GROUND BORING DEVICE

FIELD OF THE INVENTION

The present invention relates to an electronic guidance system and method for accurately locating a boring device, and more particularly to a guidance system and method wherein the use of two navigation techniques minimizes the error in locating the boring device.

BACKGROUND OF THE INVENTION

Directional drilling refers to a type of drilling where a drill tool is directed along a predetermined path by an operator located at a boring machine. By guiding the drill tool from the drilling site, cabling, pipes, or other underground conduits may be installed with minimal disruption to the surface above the location where the borehole is being drilled. Directional drilling techniques have therefore become especially prevalent where there are obstacles on the surface that would make trenching or other conventional installation techniques impossible. For example, directional drilling techniques are especially advantageous when constructing a horizontal borehole beneath a body of water, a roadway, or buildings. Because directional drilling can proceed without regard to surface structures, it has become the chosen technique for many applications.

In many directional drilling techniques, directing a drill tool on a predetermined course is an iterative operation consisting of a locating phase and a drilling phase. During the locating phase, the drill is halted and the position and orientation of the drill tool is determined using one of several methods described in more detail below. Based on the location of the drill tool, an operator can calculate how close the drill tool is to a predetermined borehole path. If the drill tool is to continue along a straight path, the drill stem and drill tool are rotated during the subsequent drilling phase. When the drilling tool is rotated and additional sections of pipe added to the drill stem, the borehole is advanced along a generally straight line. If the drill tool must change direction to bring the borehole back to the predetermined path, the orientation of the drill tool must be determined. In one type of directional drilling system, the connection between the drilling head and the drill collar is slightly bent. The orientation of the bent connection determines the direction that the drill tool will advance when forward pressure is applied and the drill string is not rotated. To direct the course of the borehole back to the predetermined course, the drill head must therefore be turned to the necessary orientation so that forward pressure applied to the drill tool will correct the path of the drill tool. In the subsequent drilling phase, the drill stem is not rotated and the drilling tool advanced. By selectively orienting the bent connection, an operator can therefore steer the drilling tool in a desired direction along a selected path. It will be appreciated that other types of directional drilling systems exist that do not rely on a bent connection to determine the path of the drill tool. Regardless of the mechanism for orienting and steering the drill tool, however, most directional drilling systems incorporate a locating phase and a drilling phase during the directional drilling operation.

Several different techniques are known in the art for determining the location of a drill tool along a predetermined path. For example, U.S. Pat. No. 4,875,014 to Roberts et at. discloses a system that uses a current-carrying grid to assist in locating and guiding a drill head. The current-carrying grid is initially placed above the desired borehole path. The drill head contains a three-axis magnetometer and a three-axis accelerometer. As the drill head proceeds underneath the current carrying grid, components of the magnetic field generated by the grid are detected by the three-axis magnetometer. Using the orientation of the drill head as determined from the three-axis accelerometer signals, the measured magnetic field vector may be transformed into the coordinate system used by the current carrying grid. By comparing the measured magnetic field vector with a number of calculated magnetic field vectors within the grid, the location of the drill head within the grid may be determined. An operator may then steer the drill head along a predetermined path by periodically checking the location of the drill head.

A more common technique for determining the location of a drill tool during horizontal boring uses a triaxial accelerometer to detect a rotation of the drill tool with respect to the gravitation force vector and a triaxial magnetometer to detect components of the Earth's magnetic field. Each of these sensors is placed in the head of the drill, where they are connected to the surface by a cable that carries power and communications. Each accelerometer is sensitive to a component of the rotation of the drill tool and produces a signal proportional to the rotation. From the electrical signals produced by the accelerometers, a system can calculate both the inclination and roll of the drill tool. Each magnetometer produces a DC voltage that is proportional to the magnitude of the earth's magnetic field component that is normal to the pickup coil in the magnetometer. As the drill tool is advanced, the signals from the magnetometer may therefore be used in conjunction with the accelerometer signals to determine the heading or azimuth of the drill tool based on the changes in the magnetic field. By integrating the inclination and azimuth of the drill tool with respect to the distance traveled, the approximate location of the drill tool may be determined. The triaxial accelerometer and triaxial magnetometer combination therefore allow an operator to roughly track the location of a drill tool as the drill tool is advanced. An advantage of using a triaxial accelerometer and magnetometer is that the locating technique is quick, and the hardware is robust and readily available.

While the use of triaxial magnetometers and accelerometers allow an operator to roughly follow a predetermined boring path, the accuracy of the resulting path is not perfect. In order to calculate the location of the boring tool, the signal from the accelerometers must be integrated over the distance traveled by the drill tool. Integrating the accelerometer signals introduces errors into the calculated position of the drill tool. Although the errors may be small for each individual position determination, the cumulative effect of the errors can be great. During the locating phase of directional drilling, errors introduced into the calculated position of the drill tool are added to and magnified by prior errors in measurement. As a result, over long drilling paths, the calculated drilling path may diverge from the desired drilling path by a significant distance when the drill tool reaches the exit point.

Although these errors have generally been acceptable in less demanding drilling applications, in certain applications errors as small as a few feet over the borehole path may be damaging to the success of a project. For example, gravity sewers rely upon a slight grade in the sewer to ensure that all sewage is fed without pumping to a desired destination. The exit point of a borehole used to install gravity sewers must also be calculated and produced with a high degree of accuracy. The installation of gravity sewers using only triaxial magnetometers and accelerometers to determine the path of the drill tool is therefore a risky proposition. The errors introduced into the resulting path due to the integration of the accelerometer signals can cause the path to deviate from the predetermined course to such an extent that the gravity flow of the sewers is impaired or the exit point inaccurate. In demanding applications where the desired drilling path must be accurately followed, it is therefore desirable to improve upon the general method of tracking and directing a drill tool by relying on accelerometer and magnetometer signals.

SUMMARY OF THE INVENTION

The present invention is directed to an electronic guidance system and method for directing an underground drill tool along a predetermined path. In a preferred embodiment of the invention, two navigation packages are located within a drill tool. The primary navigation package comprises a triaxial magnetometer and triaxial accelerometer. The set of signals produced by the triaxial magnetometer and triaxial accelerometer are manipulated to determine the orientation of the drill tool and, by integration over the distance the drill tool has traveled, the approximate position of the drill tool during the directional drilling operation. The secondary navigation package comprises a magnetic dipole antenna that is placed within the drill tool. The magnetic dipole antenna emits an electromagnetic field having a predetermined radiation pattern. Using a locating device such as the device disclosed in U.S. Pat. No. 4,806,869 to Chau et al. (expressly incorporated herein by reference), an independent indication of the position of the drill tool can be determined. When used in conjunction, the two navigation packages ensure accurate guidance of the drill tool. In a preferred method of operation, the magnetometer and accelerometer are used to guide the drill tool during the majority of the boring operation. Periodically, however, the actual position of the drill tool is determined using the locating device. When the actual position is determined, errors which have crept into the calculated tool location may be removed by updating the calculated position of the drill tool to equal the actual drill tool position. By periodically eliminating the integration error, the predetermined boring path may be more accurately followed. While the predominant error corrected by the disclosed system and method is the error introduced by the integration calculation, other errors that may have affected the calculated position determination will also be eliminated.

In addition to ensuring accurate placement of the drill tool, the use of two position locating techniques within a single guidance system offers many advantages over the use of a single technique. Most importantly, the use of two techniques to determine position allows an operator to select the most appropriate technique depending upon the actual conditions in the field. For example, when drilling under buildings or large structures, it is often impractical and impossible to track a drill tool's location using a signal from a magnetic dipole antenna due to interference. In these situations, the signals from the accelerometer and the magnetometer can be solely used. In contrast, the magnetometer is not highly accurate during the initial 50 feet of drilling due to magnetic interference from the drill. During the initial drilling phase, the magnetic dipole antenna can therefore be used to determine the depth, location, and heading of the drill tool. In general, each technique has strong points which complement the shortcomings of the other technique.

It is an additional advantage of the disclosed electronic guidance system and method that should one of the navigation packages fail, drilling can be typically completed using the remaining navigation package. For example, if communication were cut off with the magnetometer and accelerometer located in a drill tool, drilling would not have to be halted and the drill tool removed and replaced. Instead, the magnetic dipole antenna could be used in conjunction with the locator to finish the drilling operation. Conversely, although the accuracy may suffer if the magnetic dipole antenna failed, drilling could still be completed with the accelerometer-magnetometer package.

A further advantage of the disclosed method and system is that data from the accelerometers and magnetometers may be routed to the surface by modulating the magnetic dipole signal produced by the magnetic dipole antenna. In a preferred embodiment of the system, the signal generated from the dipole antenna has a frequency of between 30 kHz and 90 kHz. Using the dipole antenna signal as a carrier wave, data produced by the magnetometers and accelerometers may be modulated on the antenna signal. It would therefore be unnecessary to route signals from the magnetometer and accelerometer to the surface using conventional techniques, such as mud pressure pulsation, hard-wired connections, or acoustic waves.

It will be appreciated that the inclusion of two navigation packages which use different locating techniques within a single electronic guidance system therefore offers several advantages over the systems currently used to locate and guide drilling tools.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
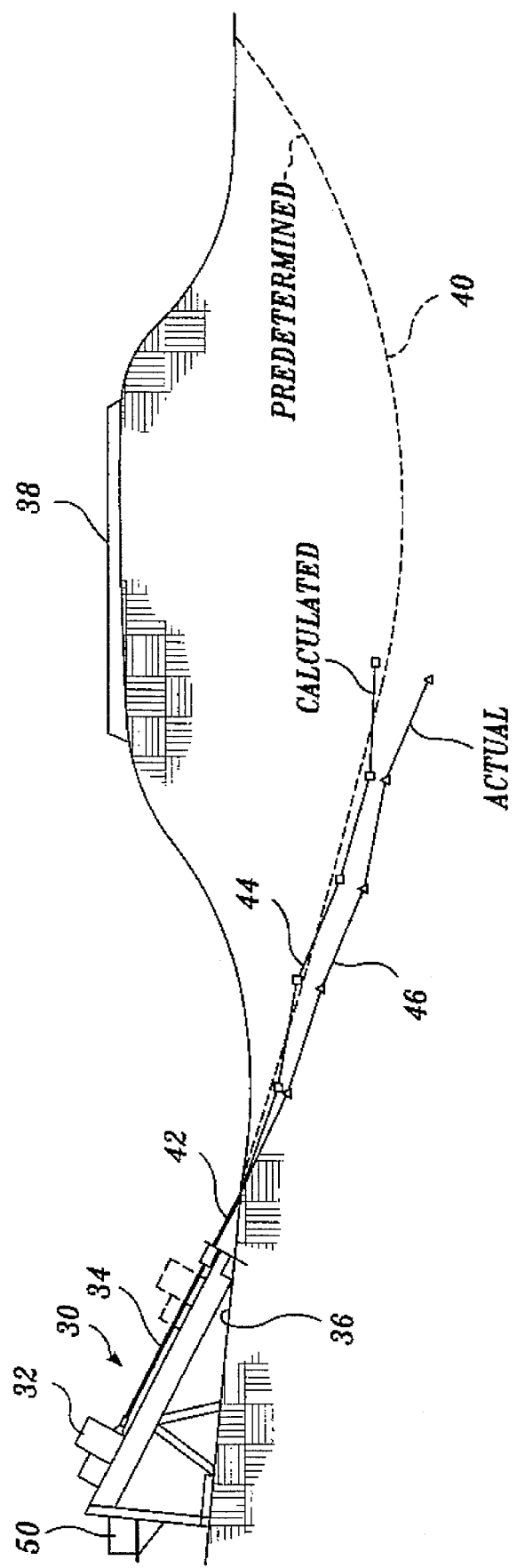
FIG. 1 is a diagrammatic view of a directional drilling system including a predetermined drilling path, a calculated drilling path, and an actual drilling path.

A navigation system for an underground drilling tool that relies on magnetometers and accelerometers to determine the location of the drill tool will typically generate an integration error that increases as the drilling tool moves farther from the boring machine. To aid in understanding the effect of this integration error, FIG. 1 shows a cross section of a typical drilling site using directional drilling techniques. For purposes of clarity, FIG. 1 only shows the effect of an integration error on the depth of the borehole. It will be appreciated, however, that the integration error will have an analogous effect on the lateral path of the borehole. Although discussed in the context of depth, the general techniques described herein are equally applicable to minimizing the effect of an integration error on a lateral borehole path deviation.

With reference to FIG. 1, a representative boring machine 30 is shown. Boring machine 30 has a movable carriage 32 that is capable of rotating and advancing a drill pipe 34 under the control of a drilling control system 50. As a number of drill pipes 34 are mated together, a drill string 42 is created, extending from the boring machine located on the surface to a drill tool (not shown) in the ground. As a primary navigation package, the drill tool is equipped with a triaxial magnetometer and a triaxial accelerometer to guide the drill tool approximately along a predetermined path. Boring machines that may be used with the present navigation system and method are disclosed in U.S. Pat. No. 4,867,255 to Baker et al. and U.S. Pat. No. 4,953,638 to Dunn. Those skilled in the art will recognize that other types of boring machines exist which can be used to selectively advance and steer a drill tool in a directional drilling operation.

Boring machine 30 sits on the earth's surface 36. As shown in FIG. 1, a predetermined path 40 of a borehole is indicated under a roadway 38. The coordinates of the predetermined path are precalculated and stored within drilling control system 50. The advantage of being able to direct a drill in a predetermined path 40 beneath the roadway is that it is not necessary to use trenching or other disruptive means to install a pipe or conduit. The predetermined path is representative of a drilling path that may be taken beneath the roadway, but is exaggerated in the drawing in terms of curve and depth at which a borehole would typically be constructed. Overlaying the predetermined path is a calculated path 44 and an actual path 46. The calculated path 44 is based on an integration of the drill tool's accelerometer and magnetometer signals as the drill tool advances, and includes an integration error. The generation of the integration error may be better understood with reference to FIGS. 2A, 2B, and 3.

Figure 2B:
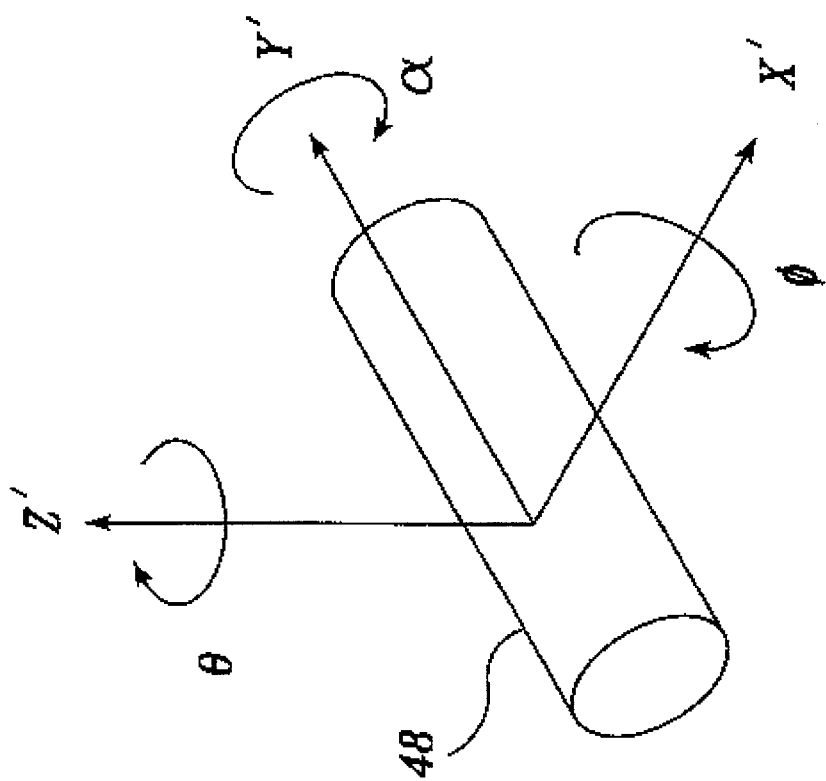
FIGS. 2A and 2B are axes representing a normal coordinate system and a drill tool coordinate system.
Figure 2A:
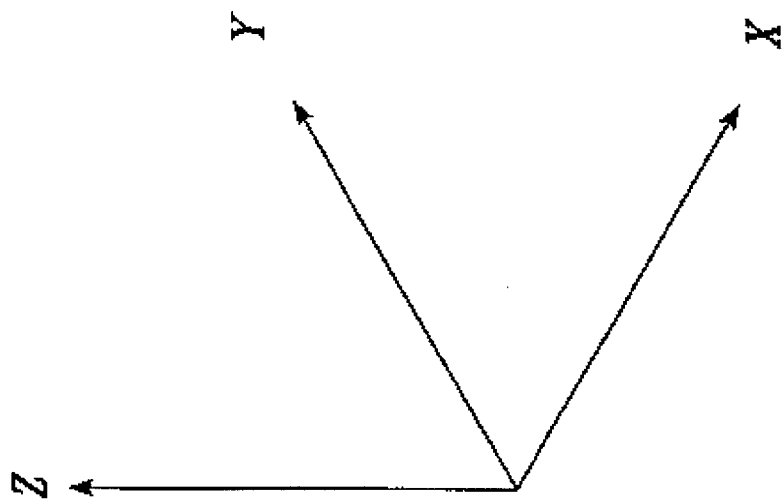

FIGS. 2A and 2B show the coordinate conventions used hereinafter to describe a drill tool's position beneath the earth's surface. FIG. 2A is a reference coordinate system, with the X and Y coordinates describing a location on the surface of the earth (over typical drilling distances, the surface of the earth may be approximated as a flat surface), and the Z coordinate describing a distance above or below the surface of the earth. The X axis, the Y axis, and the Z axis are all orthogonal. FIG. 2B shows a relative coordinate system that accompanies a drill tool, represented as a cylinder 48. The Y' axis extends along the drill tool path, axially of the tool, and the X' axis and the Z' axis are orthogonal with respect to the Y' axis. When determining the orientation of the drill tool, there are three characteristic movements that are generally described. The first is a change in heading or azimuth of the drill tool, indicated by the drill tool rotating around the Z' axis as shown by the angle $\Theta$. The second movement is a change in the drill tool pitch or inclination. A change in pitch is indicated by a rotation around the X' axis, as indicated by the angle $\Phi$. The third and final movement of the drill tool is the roll of the drill tool, indicated by a motion around the Y' axis as shown by angle $\alpha$.

Figure 3:
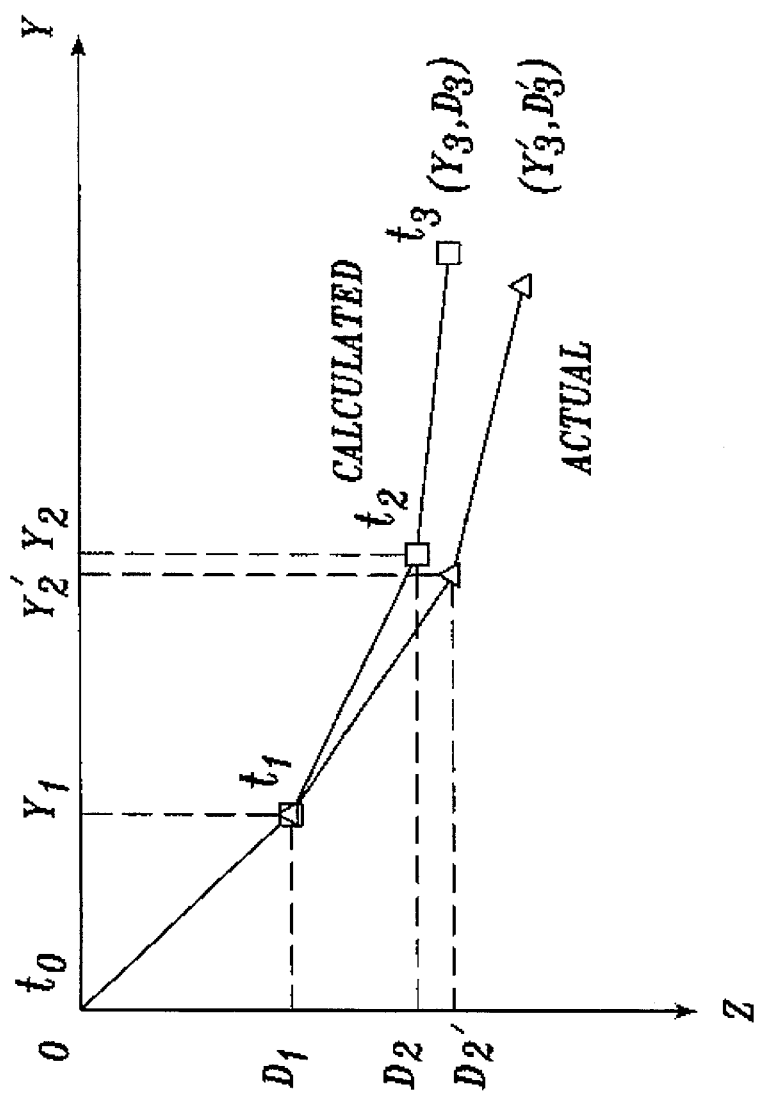
FIG. 3 is a graph portraying an integration error causing a calculated drilling path and an actual drilling path to diverge.

FIG. 3 is a simplified graph of the Y and Z components of a drill tool path. As with FIG. 1, however, the discussion that follows applies equally to the lateral components (i.e., X components) of the drill tool path. At time $t_0$, the drill tool remains on the surface of the earth at the desired entry point. During the initial drilling phase, the drill tool travels a certain horizontal distance and a certain depth beneath the surface of the earth. At time $t_1$, the drill tool has traveled a horizontal distance $Y_1$ and has descended a depth $D_1$. During the directional drilling locating phase, the calculated position of the drill tool at time $t_1$ is determined. The triaxial accelerometer mounted on the drill tool includes three accelerometers that measure the gravitational force in the Y', X', and Z' directions, respectfully designated $G_{x'}$, $G_{y'}$, and $G_{z'}$. Using the signals from the three accelerometers, the drill tool pitch and roll angles may be determined from the following relationships:

$$\alpha = \arctan\left(\frac{G_{x'}}{G_{z'}}\right) \quad (1)$$

$$\phi = \arctan\sqrt{\frac{G_{x'}^2 + G_{y'}^2}{G_{y'}}} \quad (2)$$

The azimuth angle cannot accurately be measured with the accelerometers since the gravity force vector is parallel to the Z' axis during normal horizontal drilling. However, using the signal from the magnetometers in conjunction with the accelerometers, it is possible to calculate the heading of the drill tool. The triaxial magnetometer contains three magnetometers that are sensitive to the nearest magnetic field. Each magnetometer produces a DC voltage proportional to the magnitude of the component of the magnetic field that is normal to the pick-up coil of the magnetometer, respectfully designated $H_{x'}$, $H_{y'}$, and $H_{z'}$. Using the following relationship, the azimuth of the drill tool may be calculated:

$$\theta = \arctan\left[\frac{G(G_{z'}H_{x'} - G_{x'}H_{z'})}{-H_{y'}G^2 + G_{y'}^2 H_{y'} + G_{x'}G_{y'}H_{x'} + G_{y'}G_{z'}H_{z'}}\right] \quad (3)$$

where:

$$G = \sqrt{G_{x'}^2 + G_{y'}^2 + G_{z'}^2}$$

In this manner, the instantaneous roll, inclination, and heading of the drill tool may be determined. In order to find the absolute location of the drill tool within the XYZ coordinate system, the drill tool azimuth and inclination may be transposed from the drill tool coordinate system and integrated over the length of the drill tool path. The distance the drill tool has traveled may be determined by the number of drill pipes 34 that have been mated to form drill string 42. Since each section of drill pipe is of a known length (10 feet in a preferred embodiment of the invention), the sum of the lengths of all the pipes will determine the distance the drill tool has traveled. The integration of the signals over the distance the drill tool has traveled gives a fairly accurate indication of the path of the drill tool and the resulting location within the XYZ coordinate system. The technique of locating a drill tool based upon accelerometer and magnetometer signals is well-known in the art.

Returning to FIG. 3, at time $t_2$ the drill tool is halted and the position of the drill tool calculated. Due to the integration error that creeps into the position calculation, although the calculated position of the drill tool places it at coordinates $(Y_2, D_2)$, the actual position of the drill tool is at $(Y_2', D_2')$. The error between the actual and the calculated position continues to increase the farther the drill tool is advanced. At time $t_3$ the calculated position is $(Y_3, D_3)$. In general, the magnitude of the error $\epsilon$ caused by integration can be calculated by the following relationship:

$$\epsilon = \sqrt{(Y_n - Y_n')^2 + (D_n - D_n')^2} \qquad (4)$$

The integration errors introduced in the locating phase cause the calculated drilling path to diverge from the actual drilling path. Although the divergence is greatly exaggerated in FIG. 1, there are applications where any divergence from the predetermined path would be damaging. For example, if gravity sewers were being constructed using directional drilling techniques, a deviation in the grade of the sewer could result in improper sewage flow or a deviation in the exit point could cause a misalignment with existing sewer lines. For this reason, the actual and the calculated paths of the borehole should be maintained as close as possible.

Figure 4:
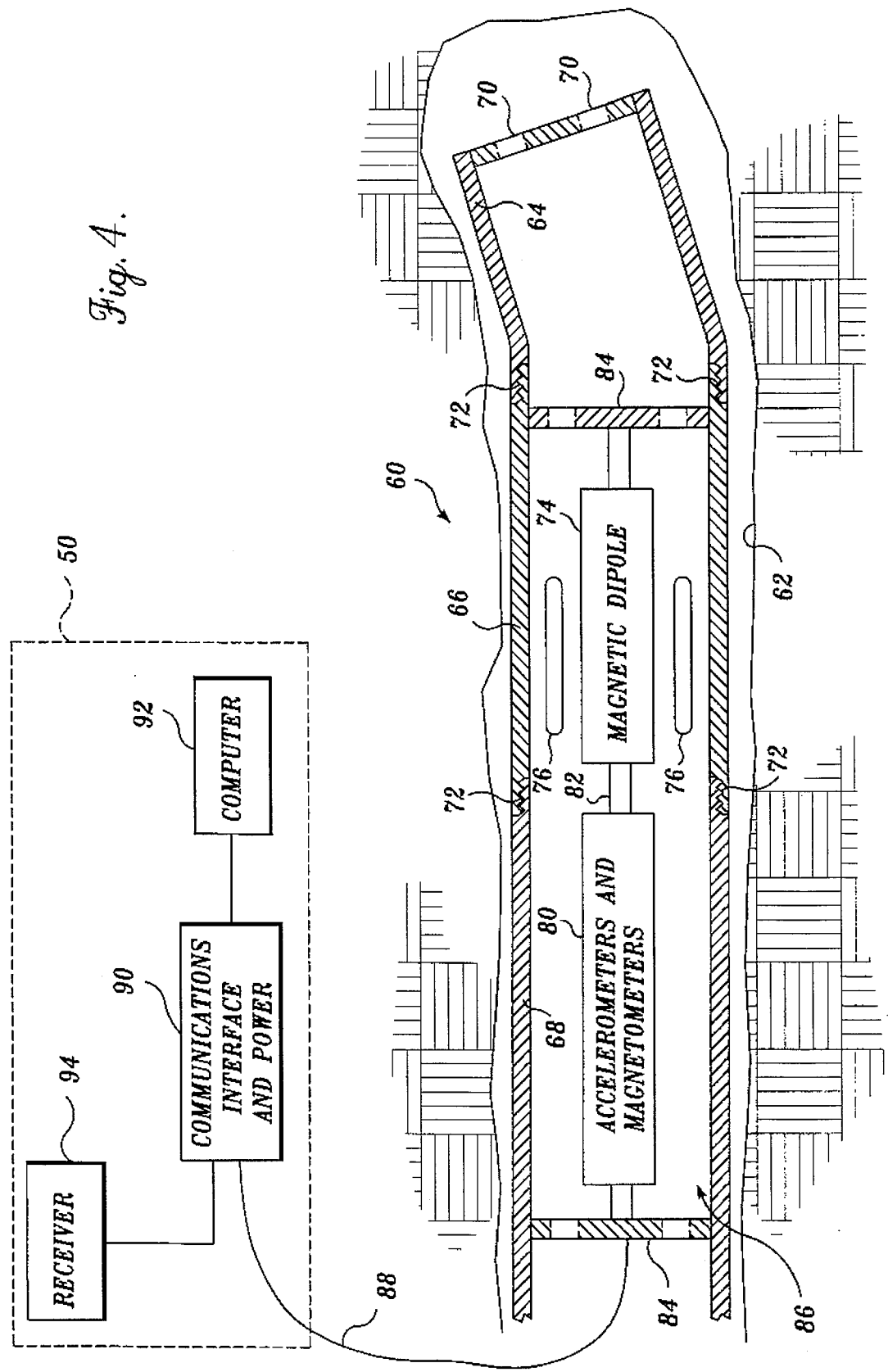
FIG. 4 is a cutaway view showing a drill tool formed in accordance with the present invention.

The present invention is directed to a method and system to minimize the magnitude of error $\epsilon$ and ensure that the actual drilling path follows the predetermined drilling path as closely as possible. A sectional view of a drill tool 60 as constructed in accordance with the present invention is shown in FIG. 4. Drill tool 60 comprises three sections. The drill tool body is constructed of a first cylindrical section of drill pipe 66 axially aligned with a second cylindrical section of drill pipe 68. A drill head 64 is positioned at the front of the drill tool, and is inclined at a slight angle from the drill tool body. The three sections of the drill tool are connected by threaded ends 72, which allow the sections to be screwed together. In a preferred embodiment of the invention, all three drill tool sections are formed of a non-magnetic alloy having a magnetic permeability as close to 1.000 as possible. A non-magnetic stainless steel meeting the strength and magnetic property requirements is Nitronic 50HS.

Drill tool 60 incorporates the downhole portions of a navigation system to determine the position of the drill tool beneath the surface of the earth. In a departure from conventional drilling systems, two navigation packages are included that use different techniques to determine the position of the drill tool. A primary navigation package 80 contains a triaxial accelerometer and a triaxial magnetometer. The triaxial accelerometer consists of three accelerometers, each oriented in the drill tool along an axis of the X'Y'Z' coordinate system. Suitable accelerometers for this application are manufactured by Allied Signal Corp. Similarly, the triaxial magnetometer consists of three magnetometers, each oriented along an axis of the X'Y'Z' coordinate system. In an actual embodiment of the invention, magnetometers manufactured by Applied Physics Labs provide sufficient accuracy for the disclosed method. A downhole microprocessor (not shown) within the primary navigation package converts the signals from the triaxial accelerometer and triaxial magnetometer into a format for transmission to the surface. A cable 88 that is coupled to the drill tool through the drill string allows the downhole microprocessor to transmit the data to a communications interface 90 located on the surface. The communications interface 90 receives the data signals from the downhole microprocessor and converts the signals into a form that may be manipulated by a navigation computer 92. Navigation computer 92 determines the approximate position of the drill tool by calculating the pitch, roll, and azimuth of the drill tool and integrating the pitch and azimuth over the distance traveled by the drill tool. A receiver 94 is also coupled to navigation computer 92 through communications interface 90. Receiver 94 is used to receive positional information about the drill tool from the secondary navigation package described below. Communications interface 90, navigation computer 92, and receiver 94 are all part of drilling control system 50.

A secondary navigation package 74 within drill tool 60 contains a magnetic dipole antenna. The magnetic dipole antenna generates a quasistatic dipole field surrounding the drill tool. The field is modulated at a rate falling within a range of a few hundred hertz to a few hundred kilohertz, with the preferred operating range falling within 30 kHz to 90 kHz. In a preferred embodiment of the invention, the magnetic dipole antenna consists of a wire wound over a ferromagnetic core. The advantage of using a ferromagnetic core is that it provides better flux linkage and therefore increases the inductance of the antenna, which in an actual embodiment should be approximately 10 mH. In a ferromagnetic core dipole antenna, the inductance of the antenna is represented by the equation $L=kn^2$, where k is related to the core material and dimension, and is approximately equal to $25 \times 10^{-8}$, and n is equal to the number of turns around the core. To achieve the desired inductance, n should therefore be about 200. In a second embodiment of the invention, a loop antenna may be substituted in place of the ferromagnetic core dipole antenna. The loop antenna consists of dielectric wire wound around a non-conductive core. It will be appreciated that because of the lower inductance of the loop antenna, additional turns will be required to produce an antenna having the desired inductance.

The voltage required to drive a ferromagnetic core dipole antenna may be approximated by the equation:

$$V = ikn^2 2\pi f \qquad (5)$$

where:

f=desired operating frequency;

n=number of turns in the antenna coil;

k=a core variable; and i=driving current.

To provide a signal level that may be detected at the surface, in a preferred embodiment f=80 kHz, n=200, k=$25 \times 10^{-8}$ and i=20 mA. The voltage necessary to produce a sufficient magnetic dipole field is therefore approximately 100 volts. Those skilled in the art will appreciate that to efficiently drive the antenna at the desired frequency, it is also desirable to place a capacitor in series with the inductor such that $1/(2\pi fC) = 2\pi fL$. If the inductance of the magnetic dipole antenna is reduced, the capacitive value must therefore increase. When a loop antenna is used in place of a ferromagnetic core dipole antenna, the capacitance may be increased to account for the reduced inductance of the loop antenna. As will be discussed in additional detail below, the electromagnetic field generated by the magnetic dipole antenna may be used to accurately locate the drill tool.

The two navigation packages are suspended within the drill pipe sections by perforated spacers 84. Perforated spacers 84 are circular disks that tightly fit within the drill pipe, and include holes around the circumference of the disks to allow mud or other drilling fluid to pass through them. By suspending the accelerometer-magnetometer package and magnetic dipole package within the interior of the drill pipe, an annular space 86 is created around the navigation packages. The annular space allows pressurized drilling fluid pumped through the drill string to pass around the navigation system, into the drill head, and out openings 70 formed in the face of the drill head. The drilling fluid cuts a path or borehole 62 through which the drill tool can travel. Those skilled in the art will recognize that other techniques can be used to drill and advance a drill tool, including the use of a fluid-powered downhole motor driving a drill bit. The particular drill tool construction shown in FIG. 4 is only a representative example used to demonstrate the physical mounting of components of the navigation system disclosed herein.

Incorporating a magnetic dipole antenna with a ferromagnetic core in a drill tool without causing interference with the accelerometers and magnetometers requires three modifications to the drill tool. First, the primary navigation package 74 must be separated from the secondary navigation package 80 by a spacer 82. Spacer 82 ensures that the magnetic dipole antenna will not interfere unduly with the magnetic field measurements taken by the magnetometers contained within the accelerometer-magnetometer package. Using the preferred magnetic dipole constructed of ferromagnetic material, it has been found that minimum spacing between the magnetic dipole package and the magnetometers within the accelerometer-magnetometer package is at least six inches.

Second, the section of drill pipe 66 surrounding the magnetic dipole antenna should be cut with a number of slots 76 to ensure that no magnetic eddy currents are generated in the pipe. Although sections of drill pipe 66 and 68 are nonmagnetic, it was found that when the pipes surrounded a magnetic dipole antenna there was a tendency for eddy currents to be generated in the pipe. The eddy currents dissipated the strength of the magnetic dipole, and minimized the distance at which the electromagnetic dipole field could be detected. The addition of slots 76 ensures that eddy currents do not form in the drill pipe and affect the strength of the resulting magnetic dipole field. In a preferred embodiment of the invention, the use of three slots 76 (two of which are shown in FIG. 4) was determined to be sufficient to inhibit the formation of eddy currents. The three slots 76 are aligned along the direction of drill tool travel, and extend through the section of drill pipe 66. To prevent drilling fluid from escaping from slots 76, a robber strip (not shown) covering each slot is affixed to the inside of the drill pipe.

Third, the package length of the primary and secondary navigation packages had to be minimized in order to maintain a relatively short overall drill tool length. The length of the drill tool affects the tool turning radius, therefore minimizing the size of the navigation packages results in a more maneuverable drill tool. At the same time, the magnetic dipole had to be placed as close to the from of the drill tool as possible to ensure an accurate position determination. As will become apparent below, the second navigation package accurately determines the position of the magnetic dipole antenna beneath the ground. Placing the magnetic dipole at the front of the drill tool near the drill head therefore results in a more accurate determination of the drill tool position. In the preferred embodiment of the invention having a ferromagnetic core dipole antenna, the length of the primary and the secondary navigation packages does not exceed 60 inches.

In the second embodiment of the invention that uses a loop antenna as the magnetic dipole antenna, two modifications must be made to the drill tool to ensure that the loop antenna will not interfere with the accelerometers and magnetometers. As before, the section of drill pipe surrounding the magnetic dipole antenna should be cut with a number of slots to ensure that no magnetic eddy currents are generated in the pipe. With a loop antenna, however, the primary and the navigation packages do not have to separated by a spacer. Instead, the loop antenna may be wound around the primary navigation package or a magnetometer contained within the primary navigation package. Wrapping the loop antenna around the magnetometer minimizes the space of the two navigation units and thereby minimizes the length of the overall drill tool. To prevent interference between the loop antenna and the magnetometer, however, the operation of the loop antenna must be alternated with the operation of the magnetometer. That is, when generating the quasistatic dipole field, the magnetometer measurements will be erroneous, and when using the magnetometer to measure the surrounding magnetic field, the loop antenna should be turned off.

Figure 5:
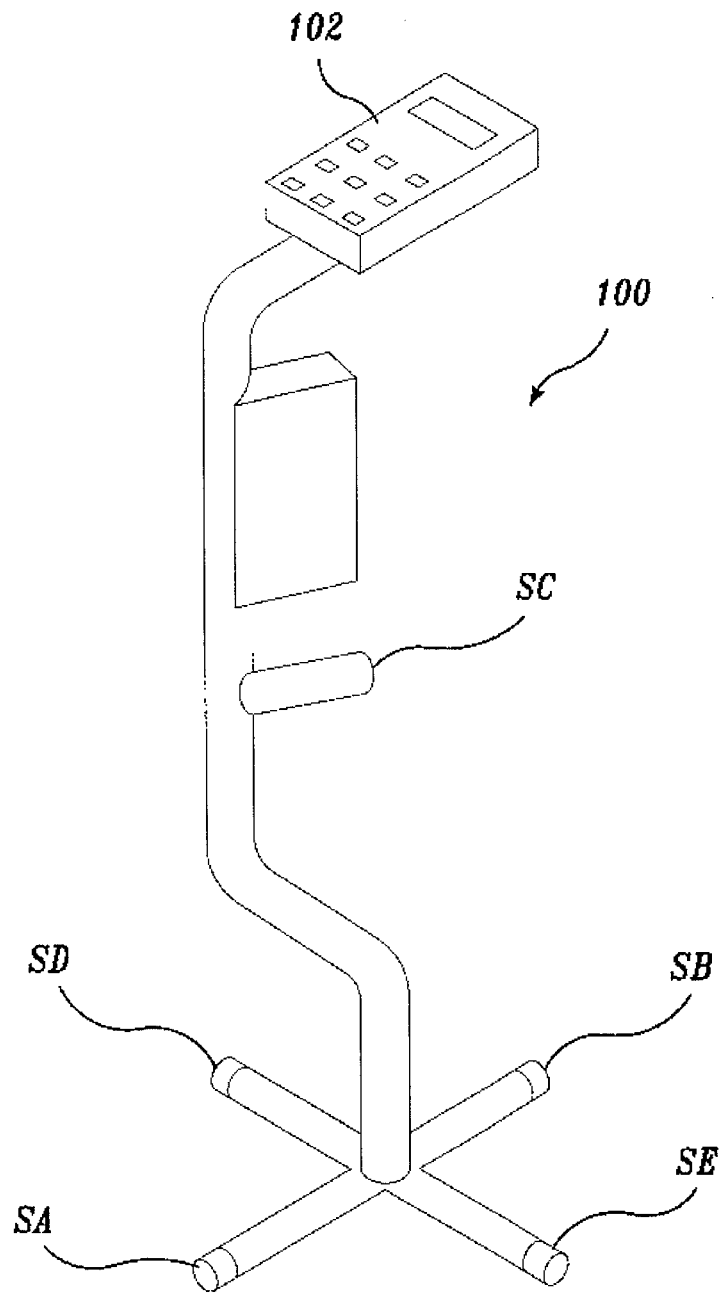
FIG. 5 is a diagrammatic view of a locating device suitable for locating the position of a drill tool from a position on the surface above the drill tool.

FIGS. 5, 6, 7 and 8 illustrate the use of the navigation system of the present invention, and more particularly, the use of the secondary navigation package to minimize errors generated by the primary navigation package. FIG. 5 is a perspective view of a locator 100 that is an element of the magnetic dipole navigation package. Locator 100 contains five sensors, SA, SB, SC, SD, and SE that are sensitive to the magnetic field generated by the magnetic dipole antenna. The construction of locator 100 and its operation is described in U.S. Pat. No. 4,806,869 to Chau et al., which is herein incorporated by reference. Based on the strength of the magnetic dipole field detected by each of the sensors, and using the method described in Chau et al., the distance between the locator 100 and the magnetic dipole antenna located within drill tool 60 may be determined with high accuracy. Locator 100 includes a display and control panel 102 to accurately show the depth and location of the drill tool with respect to the locator. In a preferred embodiment of the invention, locator 100 also includes a transmitter (not shown) to transmit the position of the drill tool to receiver 94 located in drilling control system 50.

Figure 6:
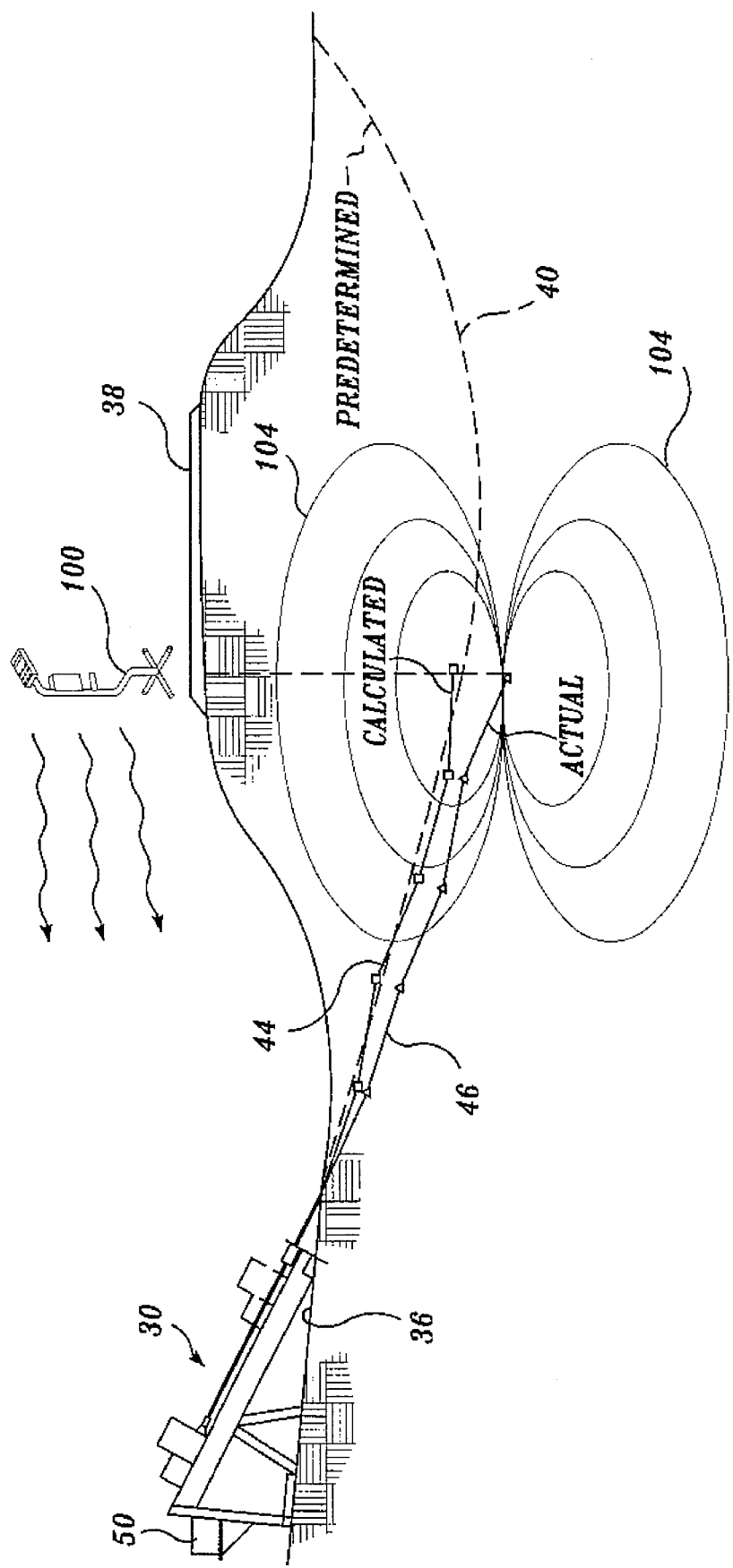
FIG. 6 is a diagrammatic view showing the use of the locator of FIG. 5 to locate an actual position of a drilling tool along a predetermined drilling path.
Figure 7:
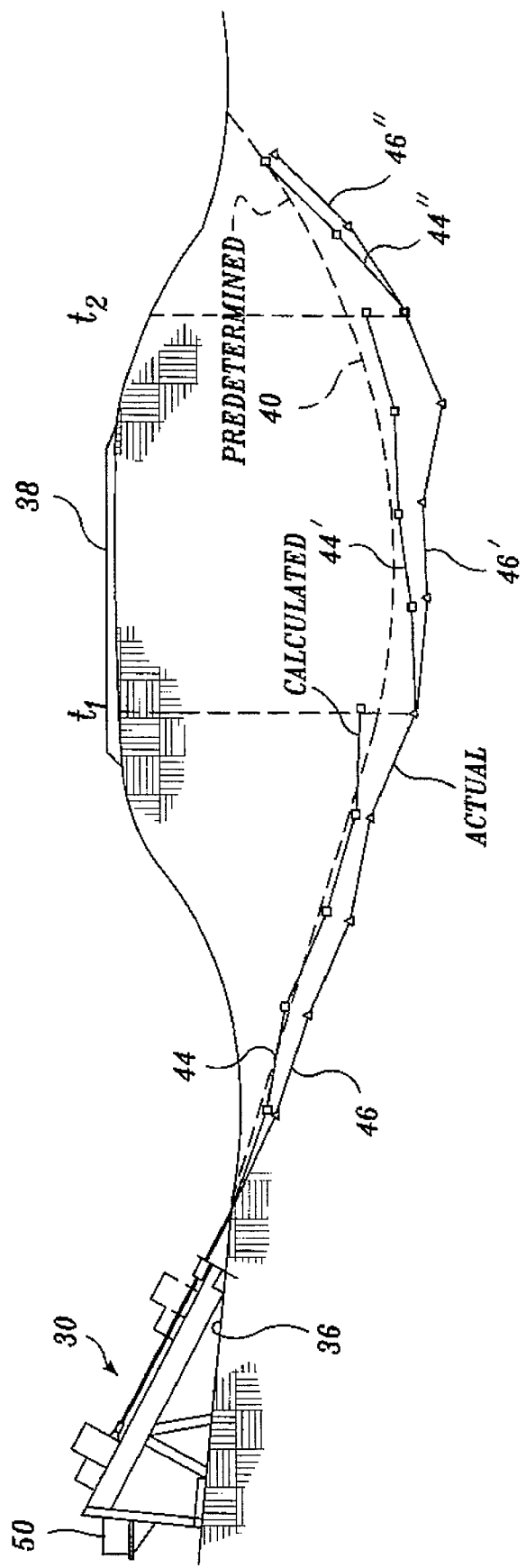
FIG. 7 is a diagrammatic view of a predetermined drilling path, a calculated drilling path, and an actual drilling path as determined by the system and method of the present invention.

The method of using the locator to minimize the error introduced in the measurement of the position of the drill tool is shown in FIGS. 6 and 7. FIG. 6 shows a profile of a drill site, with a locator being used to accurately determine the position of a drill tool at a time $t_1$. Locator 100 is positioned along the predetermined path at the approximate distance from the boring machine where the drill tool is located. An electromagnetic dipole field 104 is emitted by the magnetic dipole antenna in the drill tool, and detected by locator 100 on the surface above the drill tool. When the depth and lateral displacement of the drill tool has been calculated by locator 100, the actual position of the drill tool is transmitted or otherwise provided to the drilling control system located at the boring machine. Using the accurate position, an operator may correct the calculated position of the drill tool as determined by the primary navigation package. In this manner, the calculated position of the drill tool can periodically be corrected to correspond to the actual position of the drill tool. That is, any accumulated integration error may be periodically set to zero by accurately locating the position of the drill tool using locator 100.

A profile of a representative path of the drill tool using the system and method described herein is shown in FIG. 7. At time $t_1$, the calculated and the actual positions of the drill tool are diverging. The use of locator 100 removes the integration error, and resets the calculated position to the actual position. The path of the drill tool is then adjusted based on the corrected position. After time $t_1$ the calculated position follows a path 44' and the actual position follows a path 46'. Again, the integration error begins to creep into the calculated position of the drill tool, causing the paths to slowly diverge. At a time $t_2$, locator 100 is again used to accurately determine the drill tool position. The calculated position of the drill tool is reset to the actual position, and drilling commences again following an adjusted drill tool path determined from the corrected coordinates. Following time $t_2$, the drill tool is directed based on a calculated path 44", but follows an actual path 46". As a result of determining the position of the drill tool using the secondary navigation package at times $t_1$ and $t_2$, the actual path 46 more closely tracks the desired path 40. The accuracy of the resulting borehole is therefore improved over a borehole created using only the primary navigation package.

Figure 8:
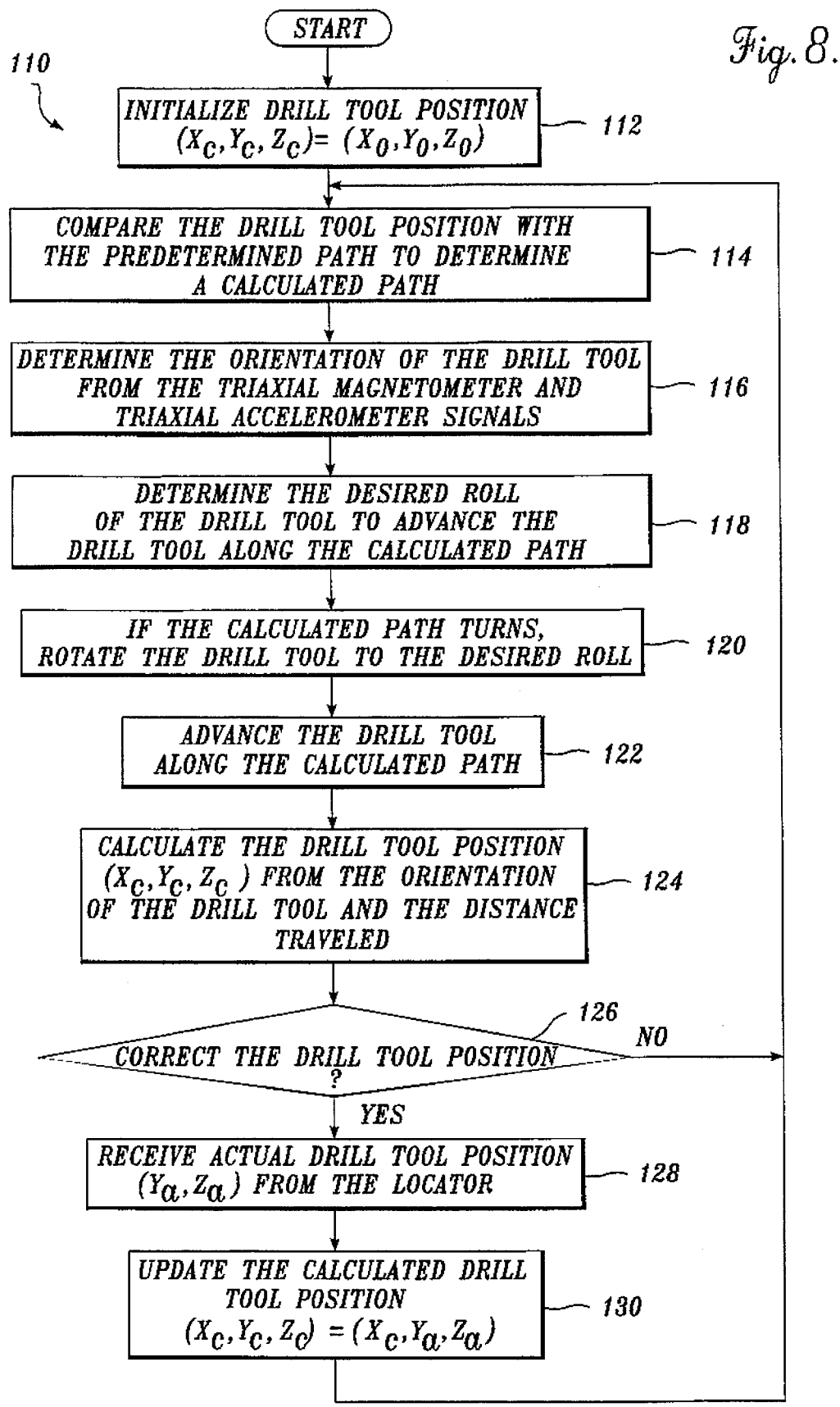
FIG. 8 is a flow chart of a program that may be used to implement the method of the present invention in a directional drilling system.

FIG. 8 is a flow chart of a computer program 110 suitable for implementing the method disclosed herein in the drilling control system 50. At a block 112, the coordinates of the drill tool are initialized to ($X_o$, $Y_o$, $Z_o$), corresponding to the location of the boring machine. At a block 114, the position of the drill tool is compared with a predetermined path that has previously been plotted and stored in the drilling control system. Based on the current position of the drill tool, a path is calculated that will follow the predetermined path or will return the drill tool to the predetermined path if the drill tool has strayed from the desired path.

After determining the calculated path that the drill tool should follow, the drill tool must be oriented so that forward pressure on the drill tool will steer the drill tool along the calculated path. At a block 116, the program determines the orientation of the drill tool from the triaxial magnetometer and triaxial accelerometer signals. The orientation of the drill tool includes the instantaneous heading, inclination, and roll of the drill tool. At a block 118, the program determines a desired roll of the drill tool so that the inclined face of the drill head is pointed in a desired direction. At a block 120, the drill string is rotated to bring the drill tool to the desired roll. It will be appreciated that the step represented by block 120 will only be necessary if the calculated path requires the drill tool to change directions. If the drill tool is to continue in a straight line, the drill string will be rotated during the drilling phase to advance the borehole in a linear path. After the drill tool has been properly oriented, at a block 122 the drill tool is advanced along the calculated path during the drilling phase of the directed drilling operation.

Following the drilling phase, the position of the drill tool is determined during the locating phase. At a block 124, the program calculates the new drill tool position ($X_c$, $Y_c$, $Z_c$) from the initial orientation of the drill tool and the distance the drill tool has traveled as indicated by the number of additional drill pipes added to the drill string. In a preferred embodiment of the program, an operator will monitor and enter the length added to the drill string between locating phases.

At a decision block 126, the program determines whether the drill tool position should be corrected. The period between correction of the calculated position of the drill tool to the actual position of the drill tool is selected by the operator of the system. In general, a shorter period will be required if it is found that the actual drill tool path diverges quickly from the calculated path. Such rapid divergence may be caused by environmental drilling conditions such as stray magnetic fields or interference from surrounding signal sources. In contrast, if an operator finds that the divergence of the actual path from the calculated path is fairly slow, the correction of the calculated position may be made infrequently. The maximum error allowable in the drilling path will also determine the period between correction of the calculated position.

If the drill tool position is not corrected, the program returns to block 114 where the calculated drill tool position is used to recompute the calculated path for the next drilling phase. If the drill tool position is to be corrected, however, the program proceeds to a block 128, At block 128, the drilling control system 50 receives the actual drill tool location as transmitted by an operator using locator 100. Locator 100 accurately determines the depth of the drill tool as well as the lateral divergence of the drill tool from the desired path. At a block 130, the program updates the calculated drill tool position to reflect the actual position of the drill tool as determined by the locator. In a preferred embodiment of the invention, only the lateral displacement (X coordinate) and the depth (Z coordinate) of the drill tool position are updated. It will be appreciated, however, that the distance of the drill tool from the boring machine could also be updated by measuring the distance between the locator and the boring machine. After updating the calculated drill tool position, the program returns to block 114 to recompute the calculated path for the next drilling phase. By periodically determining the actual tool position, program 110 effectively removes accumulated integration error from the calculated drill tool path.

Several advantages arise from the use of the primary and the secondary navigation packages described herein. The use of triaxial magnetometers and accelerometers in the primary navigation package greatly improves the speed of the directed drilling operation over that possible using only the secondary navigation package. Although the navigation technique using the magnetic dipole antenna is highly accurate, it is also relatively slow. By combining the two techniques and only periodically using the locator to remove errors generated by the primary navigation package, the speed and accuracy of the directional drilling process is optimized. Additionally, the use of redundant navigation packages allows drilling to be completed should one of the navigation packages fail. The use of two packages therefore maximizes the success that drilling will be completed without complications.

While the preferred embodiment of the invention has been illustrated and described, it will be appreciated that various changes can be made therein without departing from the spirit and scope of the invention. Although the preferred embodiment discussed above uses a triaxial magnetometer and triaxial accelerometer as a primary navigation package, those skilled in the art will recognize that other navigation techniques could be used to determine the location of the drill tool. For example, the technique described in U.S. Pat. No. 4,875,014 to Roberts et al., where a current carrying grid is used to determine the location of a drill tool within the grid, could be used as a primary navigation technique. A magnetic dipole antenna could still be added as a secondary, navigation package and used by the method described herein to improve the accuracy of any primary navigation technique. It is therefore an object of the appended claims to cover all modifications and variations that came within the spirit and scope of the invention.

The embodiments of the invention in which an exclusive property or privilege is claimed are defined as follows:

1. A navigation system for determining a position of a boring device within the ground, the navigation system comprising:

(a) a navigation computer located at a distance from said boring device;

(b) a primary navigation package coupled to said boring device and comprising means for generating a first set of signals indicative of the position of the boring device and a transmitter for transmitting the signals to the navigation computer, wherein the navigation computer can calculate a first position of the boring device from the first set of signals generated by the first navigation package; and (c) a secondary navigation package coupled to said boring device and comprising means for generating a second set of signals indicative of the position of the boring device and a transmitter for transmitting the signals to the navigation computer, wherein the navigation computer can calculate a second position of the boring device from the second set of signals generated by the second navigation package, the navigation computer further periodically setting the first position equal to the second position to correct any error present in the first position.

2. The navigation system of claim 1, wherein the primary navigation package comprises:

(a) a triaxial accelerometer located in said boring device and producing a first set of data signals representative of a rotation of said boring device; and (b) a triaxial magnetometer located in said boring device and producing a second set of data signals representative of a strength of a magnetic field intersecting the triaxial magnetometer in said boring device.

3. The navigation system of claim 2, wherein the secondary navigation package comprises:

(a) radiating means located in said boring device for emitting an electromagnetic field having a predetermined radiation pattern; and (b) a locator for detecting the electromagnetic field emitted from the radiating means and for determining an actual position of the radiating means by measuring the strength of the received electromagnetic field.

4. The navigation system of claim 3, wherein the radiating means is a magnetic dipole antenna.

5. The navigation system of claim 4, wherein the magnetic dipole antenna is a ferromagnetic core dipole antenna.

6. The navigation system of claim 5, wherein the ferromagnetic core dipole antenna is separated from the triaxial magnetometer by at least 6 inches.

7. The navigation system of claim 6, wherein the ferromagnetic core dipole antenna is proximate to a boring head of the boring device.

8. The navigation system of claim 7, wherein the ferromagnetic core dipole antenna is positioned between the primary navigation system and the boring head.

9. The navigation system of claim 4, wherein the magnetic dipole antenna is a loop antenna.

10. The navigation system of claim 9, wherein the loop antenna is proximate to a boring head of the boring device.

11. The navigation system of claim 10, wherein the loop antenna encircles the primary navigation package.

12. The navigation system of claim 10, wherein the loop antenna encircles the triaxial magnetometer.

13. A navigation system for determining the position of a boring device within the ground, the navigation system comprising:

(a) a navigation computer;

(b) a primary navigation package comprising:
  (i) a triaxial accelerometer located in said boring device and producing a first set of data signals representative of a rotation of said boring device;
  (ii) a triaxial magnetometer located in said boring device and producing a second set of data signals representative of a strength of a magnetic field intersecting the triaxial magnetometer in said boring device; and
  (iii) a transmitter for transmitting the first set of data signals representative of the rotation of the boring device and the second set of data signals representative of the strength of the magnetic field intersecting the triaxial magnetometer to the navigation computer, wherein the navigation computer can manipulate the first and the second set of data signals to determine a calculated position of said boring device within the ground; and (c) a secondary navigation package comprising:
  (i) radiating means located in said boring device for emitting an electromagnetic field having a predetermined radiation pattern;
  (ii) a locator for detecting the electromagnetic field emitted from the radiating means and for determining an actual position of the radiating means by measuring the strength of the received electromagnetic field; and
  (iii) a transmitter for transmitting the actual position of the radiating means to the navigation computer, wherein the navigation computer periodically sets the calculated position of the boring device generated by the primary navigation package to the actual position of the radiating means generated by the secondary navigation package to correct an error that has occurred in the calculated position as determined by the primary navigation package.

14. The navigation system of claim 13, wherein the radiating means is a magnetic dipole antenna.

15. The navigation system of claim 14, wherein the magnetic dipole antenna is a ferromagnetic core dipole antenna.

16. The navigation system of claim 15, wherein the ferromagnetic core dipole antenna is separated from the triaxial magnetometer by at least 6 inches.

17. The navigation system of claim 16, wherein the ferromagnetic core dipole antenna is proximate to a boring head of the boring device.

18. The navigation system of claim 17, wherein the ferromagnetic core dipole antenna is positioned between the primary navigation system and the boring head.

19. The navigation system of claim 14, wherein the magnetic dipole antenna is a loop antenna.

20. The navigation system of claim 19, wherein the loop antenna is proximate to a boring head of the boring device.

21. The navigation system of claim 19, wherein the loop antenna encircles the primary navigation package.

22. The navigation system of claim 19, wherein the loop antenna encircles the triaxial magnetometer.

23. A method of accurately following a predetermined borehole path by monitoring the position of a boring device beneath the ground, the boring device containing a primary navigation package containing means for generating a first set of signals indicative of the position of the boring device and a secondary navigation package containing means for generating a second set of signals indicative of the position of the boring device, the method comprising the steps of:

(a) receiving the first set of signals indicative of the position of the boring device;

(b) calculating a first position of the boring device; and (c) guiding the boring device along the predetermined borehole path based on the calculated first position, the first position being periodically cleared of accumulated error by:
  (i) receiving the second set of signals indicative of the position of the boring device;
  (ii) calculating a second position of the boring device; and (iii) setting the first position of the boring device equal to the second position of the boring device to remove any error present in the first position.

24. A method of accurately following a predetermined borehole path by monitoring the position of a boring device beneath the ground, the boring device containing a primary navigation package comprising a triaxial magnetometer and a triaxial accelerometer and a secondary navigation package comprising a radiating means for emitting an electromagnetic field having a predetermined radiation pattern and a locator for determining a position of the radiating means by measuring a strength of the electromagnetic field emitted from the radiating means at a point distant from the radiating means, the method comprising the steps of:

(a) receiving a first set of signals from said triaxial magnetometer indicative of a magnetic field intersecting the triaxial magnetometer and a second set of signals from said triaxial accelerometer indicative of a rotation of said boring device;

(b) calculating a first position of the boring device from the first set of signals, and the second set of signals; and (c) guiding the boring device based on the calculated first position, the first position being periodically corrected of an accumulated error by:
  (i) determining a second position of the boring device by using the locator to determine the position of the radiating means; and
  (ii) setting the first position equal to the second position.

* * * * *